US012496666B2

(12) United States Patent
Koricanek (10) Patent No.: US 12,496,666 B2
(45) Date of Patent: Dec. 16, 2025

(54) METHOD FOR REMOVAL OF VALVE SEATS WITHIN FLUID END ASSEMBLY

(71) Applicant: Bobby Lee Koricanek, Yorktown, TX (US)

(72) Inventor: Bobby Lee Koricanek, Yorktown, TX (US)

( * ) Notice: Subject to any disclaimer, the term of this patent is extended or adjusted under 35 U.S.C. 154(b) by 2 days.

(21) Appl. No.: 18/116,247

(22) Filed: Mar. 1, 2023

(65) Prior Publication Data

US 2023/0279854 A1 Sep. 7, 2023

Related U.S. Application Data

(60) Provisional application No. 63/268,772, filed on Mar. 2, 2022, provisional application No. 63/268,770, filed on Mar. 2, 2022.

(51) Int. Cl.
| | |
|---|---|
| *B23P 19/00* | (2006.01) |
| *B23P 19/04* | (2006.01) |
| *E21B 43/26* | (2006.01) |
| *F04B 53/10* | (2006.01) |
| *F04B 53/12* | (2006.01) |
| *F04B 53/22* | (2006.01) |
| *F04B 19/22* | (2006.01) |
| *F04B 53/16* | (2006.01) |

(52) U.S. Cl.
CPC .......... *B23P 19/04* (2013.01); *E21B 43/2607* (2020.05); *F04B 53/1087* (2013.01); *F04B 53/129* (2013.01); *F04B 53/22* (2013.01); *F04B 19/22* (2013.01); *F04B 53/162* (2013.01)

(58) Field of Classification Search
CPC .. B23P 19/04; E21B 43/2607; F04B 53/1087; F04B 53/129; F04B 53/22; F04B 19/22; F04B 53/162; F04B 53/16; F04B 47/02
See application file for complete search history.

(56) References Cited

U.S. PATENT DOCUMENTS

| | | |
|---|---|---|
| 9,010,412 B2 | 4/2015 | McGuire |
| 2010/0135833 A1 | 6/2010 | Schwegman |
| 2011/0189040 A1 | 8/2011 | Vicars |
| 2011/0206547 A1 | 8/2011 | Kim et al. |
| 2014/0322050 A1 | 10/2014 | Marette et al. |
| 2017/0159655 A1 | 6/2017 | Morreale et al. |
| 2017/0342976 A1 | 11/2017 | Nagaraja Reddy et al. |
| 2019/0154033 A1 | 5/2019 | Brooks et al. |
| 2019/0353251 A1 | 11/2019 | Guerra et al. |

(Continued)

FOREIGN PATENT DOCUMENTS

CN 113714766 A * 11/2021 .............. B23P 19/04

OTHER PUBLICATIONS

English translation of CN-113714766-A (Year: 2021).*

(Continued)

*Primary Examiner* — Jun S Yoo
(74) *Attorney, Agent, or Firm* — Cabello Hall Zinda, PLLC (57) ABSTRACT

A method is disclosed for removing/installing both the upper and lower valve seat in a fluid end for a high-pressure pump with a plurality of horizontal plunger bores and an equal amount of vertical suction bores. Vertical suction bore contains a valve seat below the plunger bore and a valve seat above the plunger bore. The lower valve seat can pass through the upper valve seat pocket and be removed from fluid end via plunger bore opening.

11 Claims, 10 Drawing Sheets

(56) References Cited

U.S. PATENT DOCUMENTS

2019/0383125 A1   12/2019  Koricanek
2021/0148345 A1    5/2021  Thomas et al.
2022/0412467 A1   12/2022  Koricanek
2023/0109018 A1*  4/2023  Du ........................ B23P 19/04

OTHER PUBLICATIONS

Office Action in copending U.S. Appl. No. 18/116,248 mailed Jul. 1, 2024, 17-pgs.
CS&P Technologies, "Fluid End Service Tools," copyright 2020, 4-pgs.
Kerrpumps, "The 7 Failures of Fluid Ends," copyright 2013, 9-pgs.
Int'l Search Report and Written Opinion in PCT Appl. PCT/US2023/014381 dated Jul. 27, 2023, 13 pgs.

* cited by examiner

METHOD FOR REMOVAL OF VALVE SEATS WITHIN FLUID END ASSEMBLY

CROSS-REFERENCE TO RELATED APPLICATIONS

This application claims the benefit of U.S. Provisional Appl. Nos. 63/268,770 and 63/268,772 filed Mar. 2, 2022, which are both incorporated herein by reference. This application is filed concurrently with U.S. application Ser. No. 18/116,248, entitled "Fluid End Assembly for Delivery of Fracture Fluid," which is also incorporated herein by reference.

FIELD OF THE DISCLOSURE

The subject matter of the present disclosure relates to fluid delivery systems, and in particular to a method for installing and retrieving valve seats in fluid ends used in high pressure oilfield frac pumps.

BACKGROUND OF THE DISCLOSURE

A current challenge that faces oil companies is to produce oil and gas in an economic manner from low permeability reservoir rocks. Production rates can be increased by resorting to hydraulic fracturing, a technique that increases rock permeability by creating cracks in the reservoir rock so that hydrocarbons can flow into the well freely. During a hydraulic fracturing operation, a slurry of proppant and fluid is pumped into the earth under very high pressure. The slurry enters the reservoir rock and fractures it. Proppants are carried in suspension by the fluid into the fractures. When the pressure is released from the well, the fractures partially close onto the proppants, which in turn leaves cracks in the rock for oil and gas to migrate into the well.

Figure 1A:
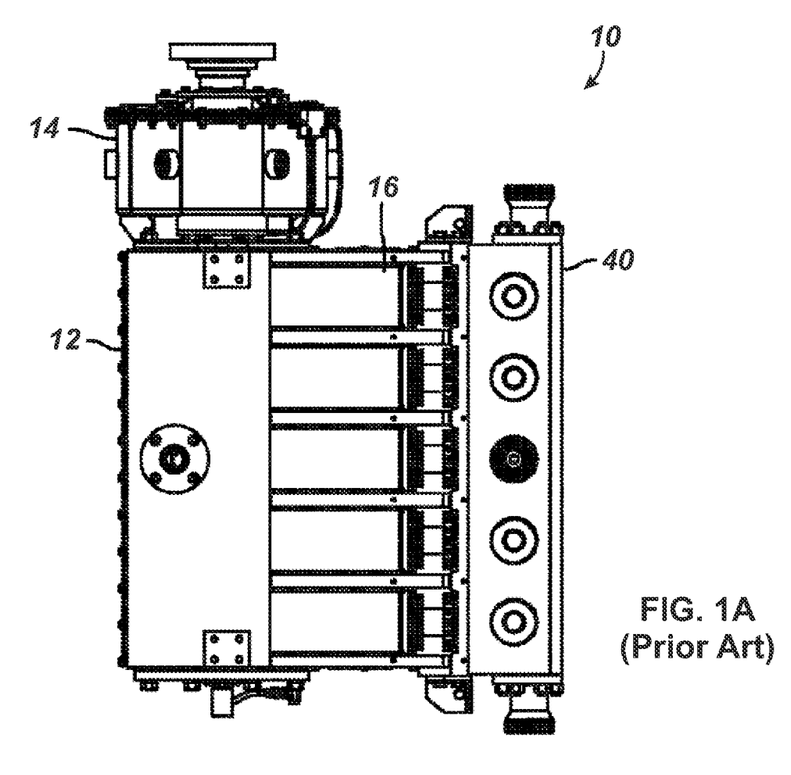
FIG. 1A is a top view of a well service pump according to the prior art.

Fluid pumps, such as well-service pumps (WSP), are used to develop the pressures necessary to complete the fracturing operation. These pumps include a power end and a fluid end and can pump fluid at higher pressures than a mud pump. A portion of a well-service pump 10 is shown in FIG. 1A. In this example, the well service pump 10 is a quintiplex well service pump, although triplex well service pumps are also used. The pump 10 has a power assembly 12, a crosshead assembly 16, and a fluid assembly or fluid end 40. A gear reducer 14 on one side of the pump 10 connects a drive (not shown) to the power assembly 12 to drive the pump 10.

Figure 1B:
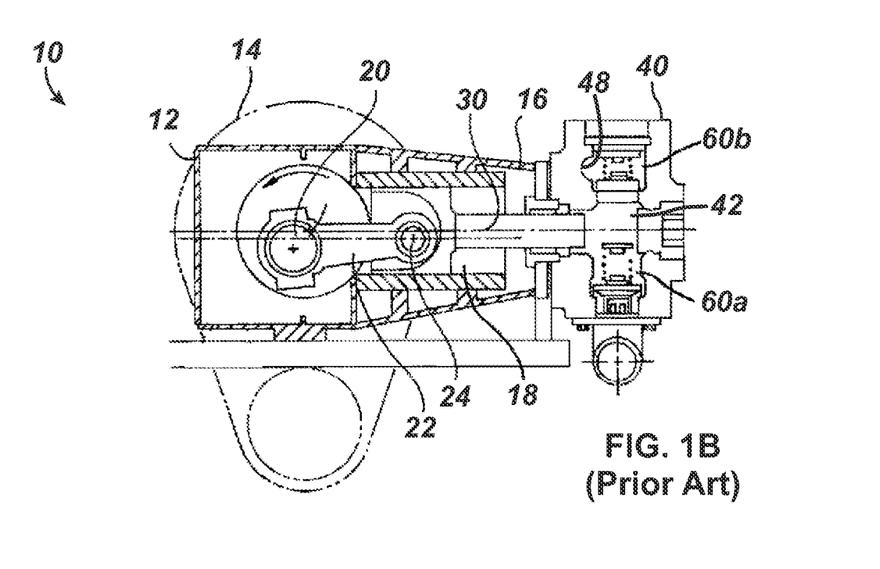
FIG. 1B is a side cross-sectional view of the well service pump of FIG. 1A.

As shown in the cross-section of FIG. 1B, the pump's power assembly 12 has a crankshaft 20 supported by bearings in the power assembly 12. Crankpins are offset from the crankshaft 20's axis of rotation and convert the rotation of the crankshaft 20 into a reciprocating motion to operate pistons or plungers 30 in the pump's fluid end 40. An end of the crankshaft 20 extends outside the power assembly 12 for coupling to the gear reducer (14; FIG. 1A) and other drive components.

Connecting rods 22 connect from the crankpins on the crankshaft 60 to the pistons or plungers 30 via the crosshead assembly 16. In a typical connection, the connecting rod 22 connects from a crankpin on the crankshaft 20 to a wrist pin 24 on a crosshead 18. The wrist pin 24 allows the connecting rod 20 to pivot with respect to the crosshead 18, which in turn is connected to the pistons or plunger 30.

During operation, an electric motor or an internal combustion engine (such as a diesel engine) drives the pump 10 by the gear reducer 14. As the crankshaft 20 turns, the crankpins reciprocate the connecting rods 22. Moved by the rods 22, the crossheads 18 reciprocate inside fixed cylinders. In turn, the plungers 30 coupled to the crossheads 18 also reciprocate between suction and power strokes in the fluid end 40. Withdrawal of the plunger 20 during a suction stroke pulls fluid into the fluid end 40 through an input valve 60a connected to an inlet 44. Subsequently pushed during the power stroke, the plunger 30 then forces the fluid under pressure out through the output valve 60b connected to an outlet 48 on the fluid end 40.

In this way, the fluid end 40 uses the reciprocating plungers 30 to displace the fluid to produce high pressures. The valves 60a-b control the fluid flow from the suction inlet 44 to the high-pressure discharge outlet 48.

Figure 2A:
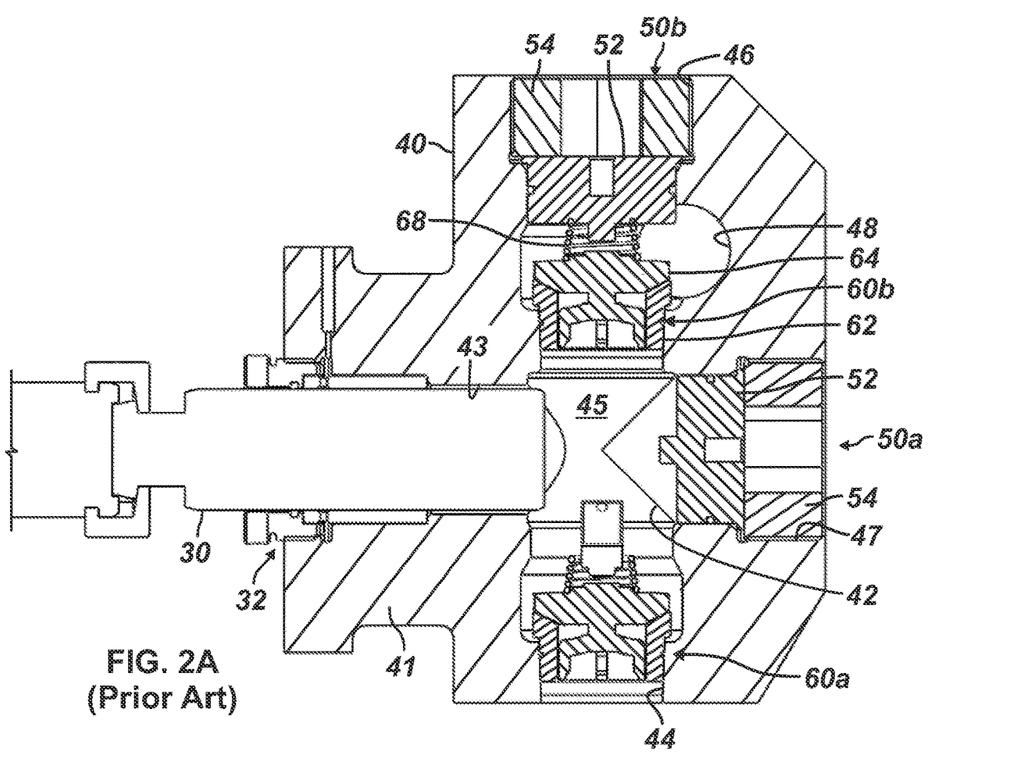
FIG. 2A is a cross-sectional view of a conventional fluid end assembly according to the prior art.

Details of a fluid end 40 are shown in further detail in the cross-sectional view of FIG. 2. The fluid end 40 has a body 41 having intersecting cross-bores 42, 43. To facilitate manufacture, a plunger bore 43 is formed horizontally through the body 41 and extends from one side to the other, and a fluid bore 42 is formed vertically through the body 41 and extends between top and bottom of the body 41. A fluid area 45 is formed at the intersection of the two bores 42, 43. The plunger 30 is inserted in one end of the plunger bore 43 and can be reciprocated back and forth as noted above. A seal arrangement 32 seals the plunger 30 in the plunger bore 43. The other end of the plunger bore 43 has an opening 47, which is sealed by a side closure (e.g., suction cover) 50a having a sand cap or cover 52 and a retainer or nut 54.

Meanwhile, the fluid bore 42 has an inlet 44 on the bottom of the body 41, and an inlet valve 60a at the inlet 44 controls fluid communication between the inlet 44 and the fluid bore 42. To facilitate manufacture, the fluid bore 42 has an opening 46 at the top of the body 41, and a closure (e.g., discharge cover) 50b having a sand cap 52 and a retainer or nut 54 seals the opening 46. An outlet or side port 48 in the body 41 communicates with the fluid bore 42, and an outlet valve 60b installed in the fluid bore 42 controls fluid communication between the outlet 48 and the fluid bore 42. As shown, the valves 60a-b can be check or poppet valves having a seat, a poppet, and a spring.

During operation, the plunger 30 reciprocates back and forth within the plunger bore 43. When the plunger 30 is moving away from the sand cap 52 of the side closure 50a, the input valve 60a opens and fluid is drawn into the fluid area 45 through suction inlet 44. Meanwhile, the output valve 46 is drawn into its upper valve seat and is closed. During this state, the high-pressure outlet 48 cannot communicate with the suction bore 42.

As plunger 30 is then pushed towards plunger bore sand cap 52, displacing the fluid under high pressure, the inlet valve 60a closes, and the conventional plunger bore 43 cannot communicate with the suction inlet 44. However, the outlet valve 60b is opened to allow the fluid in the fluid area 45 to travel to high pressure outlet 48.

As noted above, the sand cap 52 and nut 54 are installed in the opposite opening 47 of the plunger bore 43 that receives the plunger 30. The sand cap 52 and nut 54 can be removed to provide access to the internal components for servicing. Unfortunately, the thread between the nut 54 and the opening 47 tends to weaken under the high cyclic pressure as the plunger 30 reciprocates and displaces fluid. For this reason, the working pressure of the conventional fluid end 40 needs to be limited to avoid cyclic fatigue.

Figure 2B:
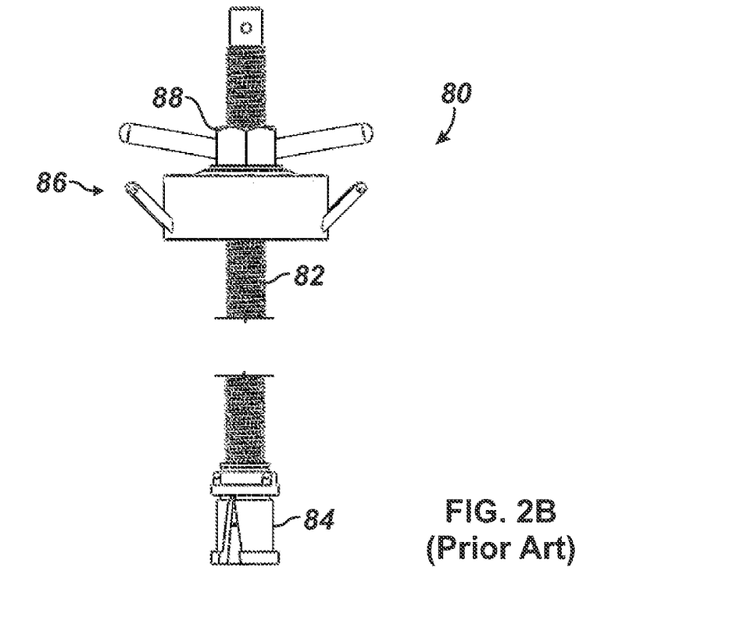
FIG. 2B shows a typical service tool for removing valve seats.

At times, the fluid end assembly 40 needs to be serviced. For example, components of the valves 60a-b may need to be replaced. A typical service tool 80 for removing the valve seats is shown in FIG. 2B. The seat removal tool 80 includes a lead screw 82, a puller 84 (having collets), a hydraulic actuator or pancake 86, a nut 88, and other components. A seat installation tool would be similarly configured but has a head that pushes the seat into a seat pocket to make a seal that prevents washing.

Figure 3A:
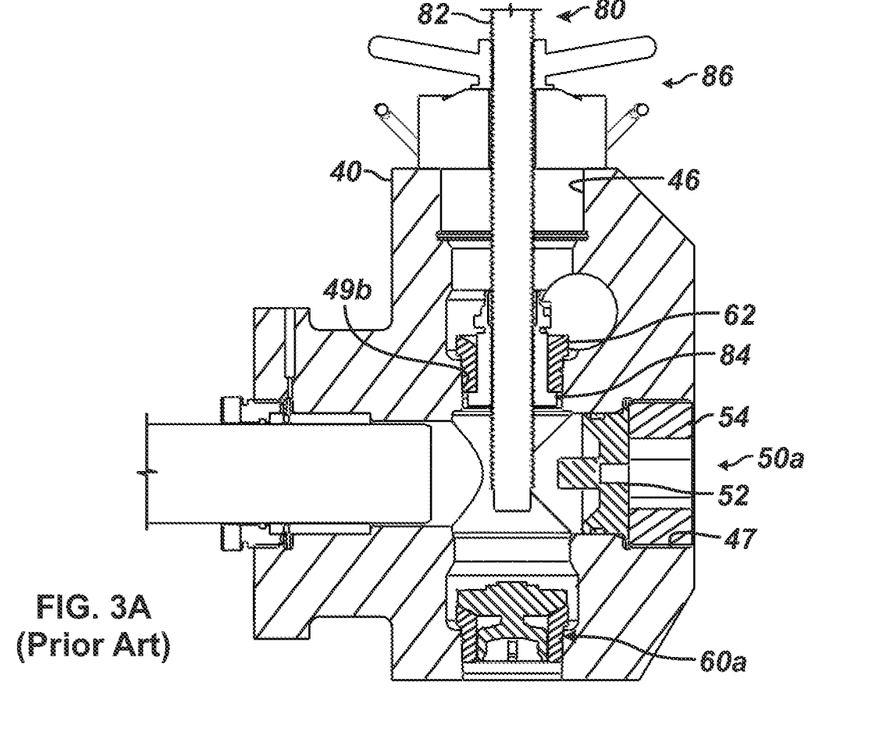
FIGS. 3A-3D show stages of removing the valves from the conventional fluid end assembly.

FIGS. 3A-3D show stages of removing the valves 60a-b from the conventional fluid end assembly 40. Referring to FIG. 3A, the seat removal tool 80 is inserted into second opening 46. The puller 84 is inserted into the outlet valve seat 62, and the collets on the puller 84 engage with the valve seat 62. The top nut 88 is threaded, and the hydraulic pancake 86 is energized to lift the lead screw 82, puller 84, and engaged valve seat 62. With sufficient force, the outlet valve seat 62 is released from the valve pocket 49b. The removal tool 80 and the valve seat 62 are then removed from fluid end 40 through second opening 46.

Figure 3B:
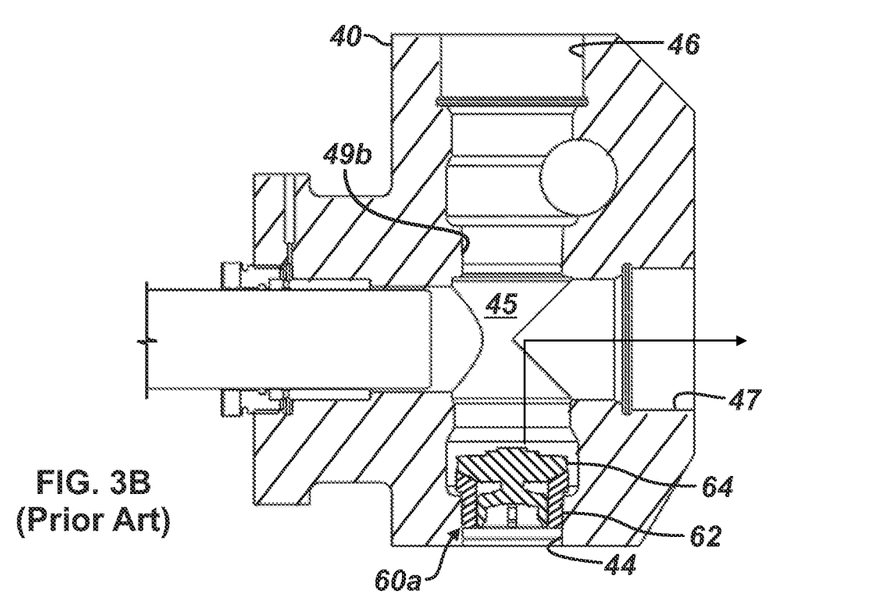

As shown in FIG. 3B, the conventional retainer 54 on the side closure 50a is threadedly removed from plunger bore opening 47, and the sand cap 52 is pulled out of the plunger bore opening 47. Then, the spring retainer 66, the valve spring 68, and the poppet 62 are removed in the conventional direction (shown by the arrow) through plunger bore opening 47.

Figure 3C:
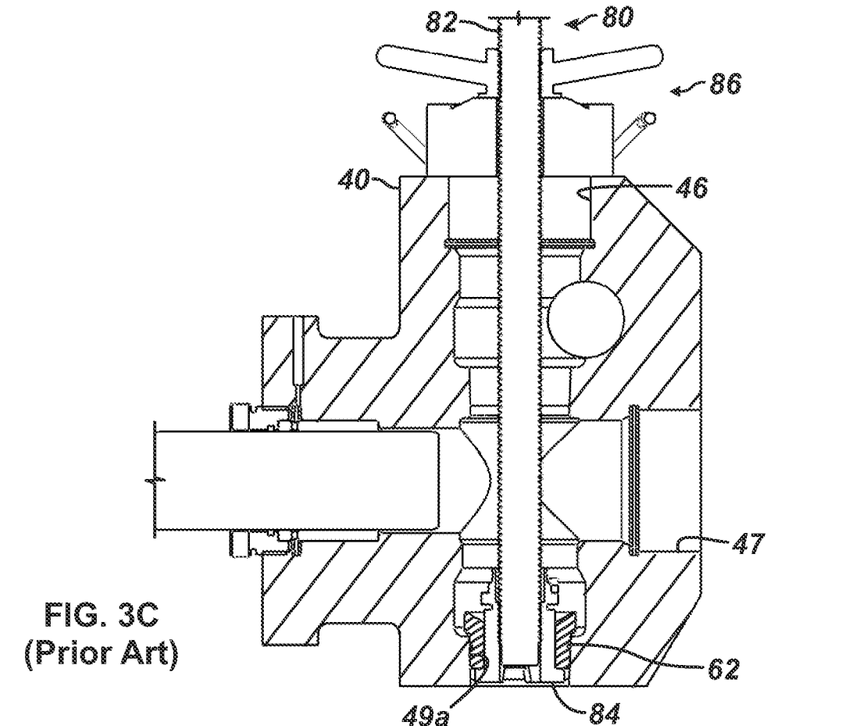

Now referring to FIG. 3C, the removal tool 80 is inserted into the upper opening 46, and the seat puller 84 is engaged with the inlet valve seat 62. The hydraulic pancake 86 is energized, and the valve seat 62 is released from seat pocket 49a. The removal tool 80 is disengaged from valve seat 62 and removed from fluid bore 45 via the upper opening 46. However, the seat 62 is removed through the plunger bore opening 47 as shown by the arrow in FIG. 3D. As shown, the minimum inner diameter D1 of the upper valve pocket 49b is smaller than the maximum outer diameter D2 of the conventional inlet valve seat 62. For this reason, the inlet valve seat 62 cannot pass through the upper valve pocket 49b and cannot be removed from the fluid end 40 via upper bore opening 46. Instead, the inlet valve seat 62 can only be removed via the plunger bore opening 47.

Figure 3D:
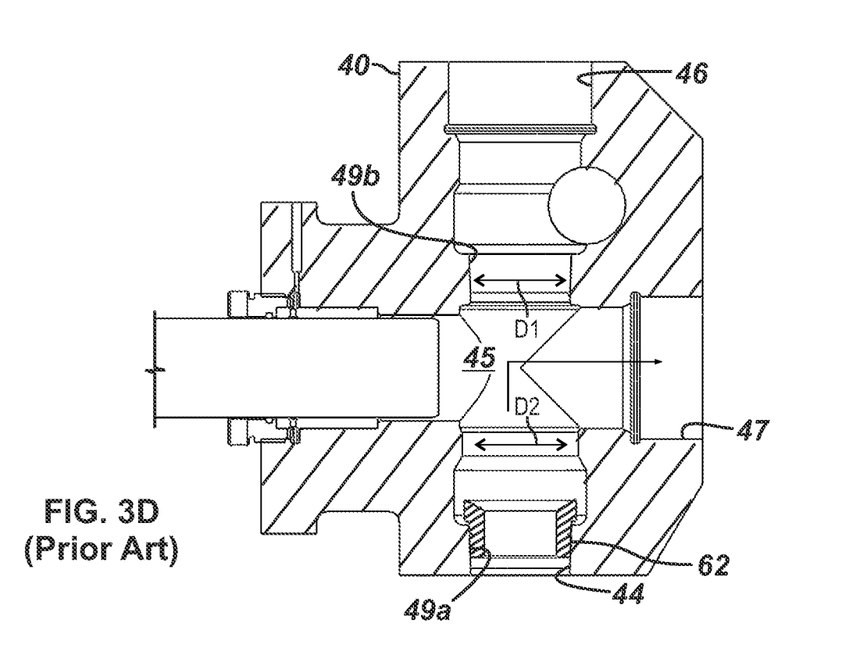

Unfortunately, the thread between the retainer 54 and plunger bore opening 47 tends to weaken and deform under the high cyclic pressure of the plunger 30 displacing the fluid. The retainer 54 can become locked into position and attempts at its removal often galls the threads and damages the conventional fluid end 40 beyond repair. Consequently, it has been often found that the conventional retainer 54 on the closure 50a for the plunger bore opening 47 cannot be removed to service the fluid end 40 in the field because the threads on the retainer 54 and opening 47 have been severely damaged due to the very high forces exerted on them. This causes significant lost time when servicing the fluid end 40 in the field and very expensive downtime for the customer.

The subject matter of the present disclosure is directed to overcoming, or at least reducing the effects of, one or more of the problems set forth above.

SUMMARY OF THE DISCLOSURE

A method is disclosed for removing components within a fluid end assembly. The fluid end assembly has a body defining a fluid bore, a plunger bore, and an outlet port. The fluid bore extends through the body between first and second opposite openings. The plunger bore extends at least partially in the body from a third opening of the body and intersects the fluid bore. The outlet port communicates with the fluid bore. The method comprises: removing a closure from the second opening of the fluid bore; removing, through the second opening, an outlet valve from an outlet seat disposed in an outlet pocket toward the second opening, the outlet pocket having an inner dimension of the fluid bore; inserting a tool into the fluid bore through the second opening, attaching the tool to the outlet valve seat, releasing the outlet valve seat from the outlet pocket using the tool, and removing the outlet valve seat through the second opening; removing, through the second opening, an inlet valve from an inlet seat disposed in an inlet pocket toward the first opening; and inserting the tool into the fluid bore through the second opening, attaching the tool to the inlet valve seat, releasing the inlet valve seat from the inlet pocket using the tool, and removing the inlet seat from the second opening, the inlet seat having an outer dimension configured to pass through the inner dimension of the outlet pocket.

Releasing the outlet seat from the outlet pocket using the tool can comprise energizing a first puller on the tool in the outlet seat until the outlet seat is released from the outlet pocket. Releasing the inlet seat from the inlet pocket can comprise energizing a second puller on the tool in the inlet valve seat until the inlet valve seat is released from the inlet pocket. Removing the closure from the second opening of the fluid bore can comprise removing a retainer and a sand cap from the second opening. Removing the outlet valve from the outlet seat can comprise removing a spring and a poppet from adjacent the outlet seat. Removing the inlet valve from the inlet seat can comprise removing a stop, a spring, and a poppet from adjacent the inlet seat.

A method is disclosed for installing components within a fluid end assembly. The fluid end assembly has a body defining a fluid bore, a plunger bore, and an outlet port. The fluid bore extends through the body between first and second opposite openings. The plunger bore extends at least partially in the body from a third opening of the body and intersects the fluid bore. The outlet port communicates with the fluid bore. The method comprises: inserting an inlet seat into the fluid bore through the second opening and through an outlet pocket toward the second opening, the inlet seat having an outer dimension configured to pass through an inner dimension of the outlet pocket; seating the inlet seat in an inlet pocket toward the first opening; installing, through the second opening, an inlet valve adjacent to the inlet seat; inserting an outlet seat into the fluid bore through the second opening; seating the outlet seat in the outlet pocket toward the second opening; installing, through the second opening, an outlet valve adjacent to the outlet valve seat; and installing a closure at the second opening of the fluid bore.

Seating the inlet seat in the inlet pocket can comprise energizing a tool against the inlet seat until the inlet seat is seated in the inlet pocket. Installing the inlet valve in the inlet seat can comprise installing a poppet adjacent the inlet seat; installing a spring adjacent the poppet; and installing a stop in the fluid bore against the spring. Installing the outlet valve in the outlet seat can comprise installing a poppet adjacent the inlet seat; and installing a spring adjacent the poppet. Installing the closure at the second opening of the fluid bore can comprise installing a sand cap in the second opening; and affixing a retainer in the second opening.

A fluid end assembly disclosed herein comprises a body, an outlet valve, and an inlet valve. The body defines a fluid bore, a plunger bore, and an outlet port. The fluid bore extends through the body between first and second opposite openings. The plunger bore extends at least partially in the body from a third opening of the body and intersects the fluid bore. The outlet port communicates with the fluid bore. The first opening defines an inlet pocket, and the second opening has an outlet pocket. The outlet pocket defines an inner dimension. The outlet valve is disposed in the outlet pocket toward the second opening of the body and is configured to control fluid communication between the outlet port and the fluid bore. The inlet valve is disposed in the inlet pocket toward the first opening of the body and is configured to control fluid communication between the first opening and the fluid bore. The inlet valve has an outer dimension configured to pass through the inner dimension of the outlet pocket.

The plunger bore can extend at least partially in the body from the third opening to a closed inner end, and the closed inner end can be exposed to the fluid bore. The closed inner end can define a concave profile integrally formed into the plunger bore. The plunger bore can extend in the body from the third opening to a fourth opening in a side of the body, and the fourth opening can have a closure.

The closure can comprise: a sand cap disposed against a shoulder defined in the fourth opening, the sand cap having a seal engaged with the fourth opening; and a retainer threaded in the fourth opening against the sand cap.

The second opening can comprise a closure being removable and being configured to seal the fluid bore. The closure can comprise: a sand cap disposed against a shoulder defined in the second opening, the sand cap having a seal engaged with the second opening; and a retainer threaded in the second opening against the sand cap.

The outlet valve can comprise: a seat disposed in the second opening; a poppet disposed between the seat and the sand cap; and a spring biasing the poppet toward the seat.

The inlet valve can be configured to permit fluid communication from the first opening to the fluid bore in response to a first pressure differential and is configured to restrict fluid communication from the fluid bore to the first opening in response to a second pressure differential; and the outlet valve can be configured to restrict fluid communication from the outlet port to the fluid bore in response to the first pressure differential and is configured to permit fluid communication from the fluid bore to the outlet port in response to the second pressure differential.

The inlet valve can comprise: a seat disposed in the first opening; a stop disposed in the fluid bore adjacent to the seat; a poppet disposed between the seat and the stop; and a spring disposed between the stop and the poppet and biasing the poppet toward the seat.

The fluid bore can define an outlet pocket toward the second opening and can define an inlet pocket toward the first opening. The outlet pocket defines a second inner dimension being greater than a first inner dimension of the inlet pocket. The inlet valve can have a maximum outer dimension configured to pass through the second inner dimension.

The foregoing summary is not intended to summarize each potential embodiment or every aspect of the present disclosure.

DETAILED DESCRIPTION

Figure 4:
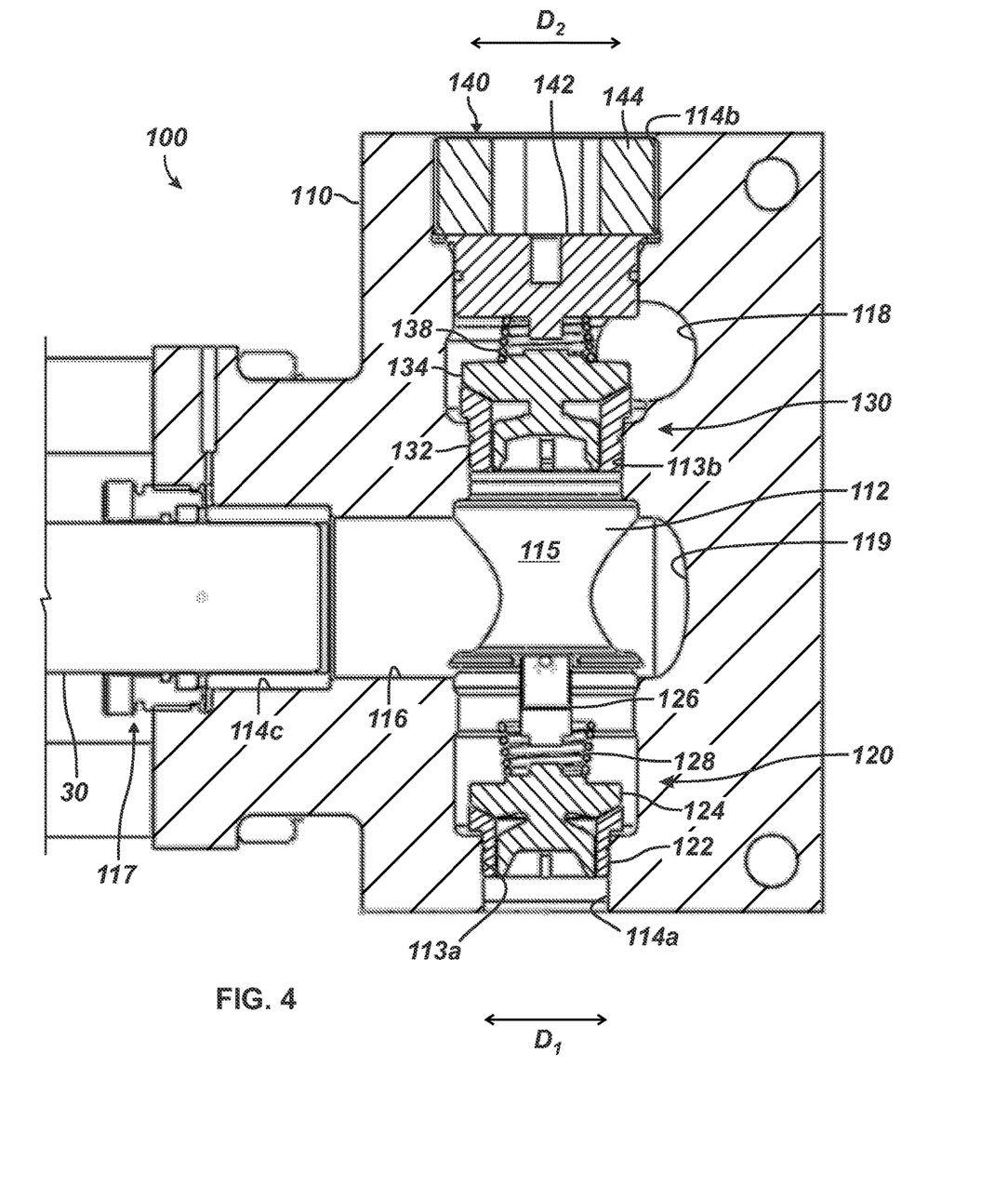
FIG. 4 is a cross-sectional view of a fluid end assembly according to the present disclosure.

FIG. 4 is a cross-sectional view of a fluid end assembly 100 according to the present disclosure. As will be appreciated, the fluid end assembly 100 can be used on a well service pump, such as the quintiplex pump of FIGS. 1A-1B, or with other types of pumps. Accordingly, a well service pump of the present disclosure has plungers 30 configured to reciprocate back and forth. The fluid end assembly 100 is mounted on the well service pump with plunger bores 116 of the assembly 100 configured to receive the plungers 30.

The fluid end assembly 100 includes a body 110, which is typically elongated to accommodate the adjacent plungers 30 of the well surface pump. The body 110 defines fluid bores 112, plunger bores 116, and an outlet port 118. In this cross-sectional view, only one set of bores 112, 116 are shown for one plunger 30, but the body 110 can have more sets of bores 112, 116 arranged laterally therein for the adjacent plungers 30 of the well surface pump.

The fluid bore 112 extends through the body 110 between first and second opposite openings 114a-b. The plunger bore 116 extends partially in the body 110 from a third opening 114c of the body 110 to a closed inner end 119. The plunger bore 116 intersects the fluid bore 112 to form a fluid chamber 115. The outlet port 118 communicates with the fluid bore 112. As is typical, the outlet port 118 is defined laterally through the body 110 and connects the several adjacent fluid bores of the assembly 100 together.

As is typical, the fluid end assembly 100 has a multitude of vertical fluid bores 112, each of which has a suction inlet at the first opening 114a at the bottom and has an opening 114b at the top of the body 110. Likewise, the fluid end assembly 100 has an equal number of horizontal plunger bores 116, which intersect a corresponding one of the fluid bores 112. As shown, the plunger bore 116 can be perpendicular to fluid bore 112. Similarly, the high-pressure outlet port 118 can be perpendicular to the fluid bore 112 and can interconnect with the multiple fluid bores 112 in the body 110. A suction manifold (not shown) is fixedly attached to the bottom of the fluid end assembly 100 to provide fluid for the suction inlets of the first openings 114a. Likewise, an output manifold (not shown) is fixedly attached to the fluid end assembly 100 to provide fluid for the outlet port 118.

Internally, an inlet valve 120 is disposed toward the first opening 114a of the body 110 and is configured to control fluid communication between the first opening 114a and the fluid bore 112. In this way, the first opening 114a forms a suction inlet of the body 110 to draw in fluid from an inlet line or piping (not shown). An outlet valve 130 is disposed toward the second opening 114b of the body 110 and is configured to control fluid communication between the outlet port 118 and the fluid bore 112.

On the body 110, the second opening 114b is closed and sealed by a closure or discharge cover 140, which seals off the fluid bore 112. This closure 140 is removable, which allows for assembly and servicing of the fluid end assembly 100. As shown, for example, the closure 140 can include a sand cap 142 and a retainer 144. The sand cap 142 is set against a shoulder in the second opening 114b and has seals to engage the opening 112. The retainer 144 threads into the second opening 114b against the sand cap 142.

For removal, installation, and service, packing 117 is inserted concentrically into the plunger bore 116. The plunger 30 is inserted into plunger bore 116, and a packing nut is threaded into the plunger bore 116 to hold the plunger packing 117 in place. At the other end of the plunger bore 116, the closed inner end 119 defines a concave or dome profile integrally formed into the end wall of the plunger bore 116. This inner end 119 is exposed to the fluid chamber 115 between the intersecting bores 112, 116.

As shown, the inlet valve 120 can be a check valve or a poppet valve and can be disposed below the fluid chamber 115 as shown. For example, the inlet valve 120 includes a seat 122, a poppet 124, a stop 126, and a spring 128. The seat 122 is concentrically located in a seat pocket 113a formed into the fluid bore 112 near the inlet opening 114a. The stop 126 is disposed in the fluid bore 112 adjacent to the seat 122. The stop 126 can be a winged clip or the like that is held in the fluid bore 112. The poppet 124 is disposed between the seat 122 and the stop 126, and the spring 128 positioned between the poppet 124 and stop 126 biases the poppet 124 toward the seat 122.

Similarly, the outlet valve 130 can be a check valve or a poppet valve and can be disposed above the fluid chamber 115 as shown. For example, the outlet valve 130 includes a seat 132, a poppet 134, and a spring 138. The seat 132 is concentrically located in a seat pocket 113b formed into the fluid bore 112 near the second opening 114b, and the poppet 134 is disposed between the seat 132 and the sand cap 142. The spring 138 positioned between the poppet 134 and sand cap 142 biases the poppet 134 toward the seat 132.

As the plunger 30 is reciprocated in the plunger bore 116, fluid is moved in the fluid chamber 115, and pressure differentials are produced on the valves 120, 130. The inlet valve 120 is configured to permit fluid communication from the first opening 114a to the fluid chamber 115 in response to a first pressure differential and is configured to restrict fluid communication from the fluid chamber 115 to the first opening 114a in response to a second pressure differential. The outlet valve 130 is configured to restrict fluid communication from the outlet port 118 to the fluid chamber 115 in response to the first pressure differential and is configured to permit fluid communication from the fluid chamber 115 to the outlet port 118 in response to the second pressure differential.

During manufacture, the fluid bore 112 is formed in the body 110 to extend through the body 110 between the first and second opposite openings 114a-b. The plunger bore 116 is formed in the body 110 to extending partially in the body 110 from a back opening 114c to a closed inner end 119 so that the plunger bore 116 intersects the fluid bore 112 to produce the fluid chamber 115. Meanwhile, the outlet port 118 is formed to communicate with the fluid bore 112 and typically runs laterally along the length of the body 110 to interconnect the multiple fluid bores 112 in the fluid end assembly 100.

Manufacture of the fluid end assembly 100 involves various machining steps, which are generally discussed here and not in any particular order. During manufacture, the fluid bore 112 is formed through the body 110. The seat pockets 113a-b and threads for the seats 122, 132 are formed in the fluid bore 112. A profile for fitting the stop 126 is formed in the fluid bore 112. Threads and shoulders for the closure 140 are formed at the second opening 114b. The outlet port 118 is formed laterally through the body 110 to communicate with the fluid bore 112. The plunger bore 116 is formed in the body 110 to have the open end 114c and the inner closed end 119. Profiles, threads, and the like are formed in the open end 114c to accommodate the packing 117 and the like. The closed inner end 119 is preferably formed to define a concave profile, which faces the fluid chamber 115 and extends beyond the circumference of the fluid bore 112.

Assembly of the fluid end assembly 100 involves various steps, which are generally discussed here. To allow for assembly, the outlet pocket 113b toward the second opening 114a defines a second inner dimension D2 that is larger than a first inner dimension D1 of the inlet pocket 113a toward the first opening 114b. This allows components of the valves 120, 130 to be passed through the second opening 114b. Therefore, the maximum outer dimension of the inlet valve 120 is configured to pass through the inner dimension D2 of the second opening 114b.

The inlet valve 120 is installed in the fluid bore 112 through the second opening 114b using a valve seating tool assembly (not shown) and other tools to position the valve's components in the features toward the first opening 114a. In general, the seat 122 of the inlet valve 120 is passed into the fluid bore 112 from the second opening 114b of the body 110 and is fit in the seat pocket 113a adjacent to the first opening 114a. The poppet 124 of the inlet valve 120 is then passed into the fluid bore 112 from the second opening 114b and is disposed adjacent to the seat 122. The stop 128 of the inlet valve 120 is then fixed in the fluid bore 112 with the spring 126 disposed between the stop 126 and the poppet 124.

After the inlet valve 120 has been installed, the outlet valve 130 is installed in a number of similar steps. For example, the outlet valve 130 is also installed in the fluid bore 112 through the second opening 114b using a valve seating tool assembly (not shown) and other tools to position the valve's components in the features toward the second opening 114b. In general, the seat 132 of the outlet valve 130 is passed into the fluid bore 112 from the second opening 114b of the body 110 and is fit in the seat pocket 113b adjacent to the second opening 114b. The poppet 134 of the outlet valve 130 is then passed into the fluid bore 112 from the second opening 114b and is disposed adjacent to the seat 132. The spring 138 is positioned against the poppet 134.

The fluid bore 112 is then sealed by installing the closure 140 in the second opening 114b. The sand cap 142 fits in the opening 114b against the spring 138. The sand cap 142 sets against a shoulder and seals in the second opening 114b, and the retainer 144 threads in the second opening 114b against the sand cap 142. A number of further steps are typically performed to integrate the fluid end assembly 100 with a well service pump. For example, the packing 117 is installed in the back opening 114b to seal with the plunger 30 when inserted in the back opening 114c.

During operation, the plunger 30 reciprocates back and forth concentrically within plunger bore 116. When the plunger 30 is moving away from the fluid chamber 115, the inlet valve 120 opens and fluid is drawn into the fluid chamber 115 through suction inlet 112. The poppet 134 of the outlet valve 130 is drawn into the valve seat 132, and the outlet valve 130 is closed. During this state, the high-pressure outlet port 118 cannot communicate with the fluid chamber 115.

As the plunger 30 is then pushed towards the fluid chamber 115, the fluid is displaced under high-pressure. The poppet 124 of the inlet valve 120 seats against the seat 132. This closes the inlet valve 120 so that the fluid chamber 115 cannot communicate with the suction inlet 114a. However, the outlet valve 130 is opened to allow the pressurized fluid to travel from the fluid chamber 115 into high-pressure outlet port 118.

Further details of the fluid end assembly 100 are disclosed in the incorporated U.S. application Ser. No. 18/116,248, entitled "Fluid End Assembly for Delivery of Fracture Fluid."

Having an understanding of the fluid end assembly 100 of the present disclosure, discussion now turns to details for removing the valves 120, 130 from the fluid assembly 100 when servicing the assembly 100.

FIGS. 5A-5G show stages of removing the valves 120, 130 from the fluid end assembly 100. As noted, a seat removal tool 80, such as in FIG. 2B, can be used to remove the seats 122, 132 of the valves 120, 130 from the seat pockets 113a-b in the fluid end assembly 100. The seat removal tool 80 includes a lead screw 82, a puller 84 (having collets), a hydraulic actuator or pancake 86, a nut 88, and other components.

Figure 5A:
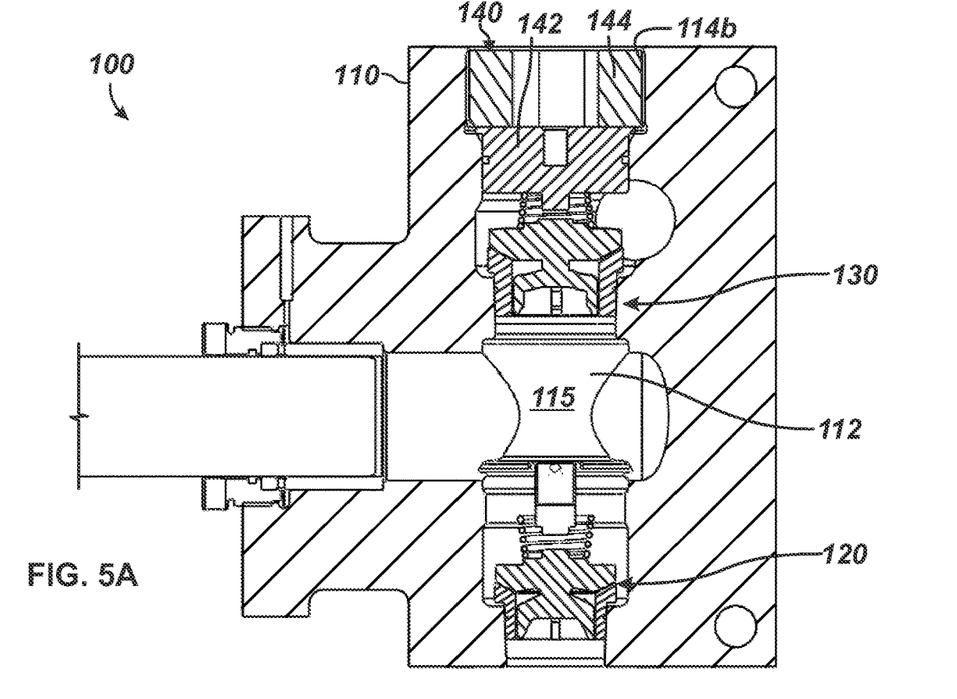
FIGS. 5A-5G show stages of removing the valves from the disclosed fluid end assembly.
Figure 5B:
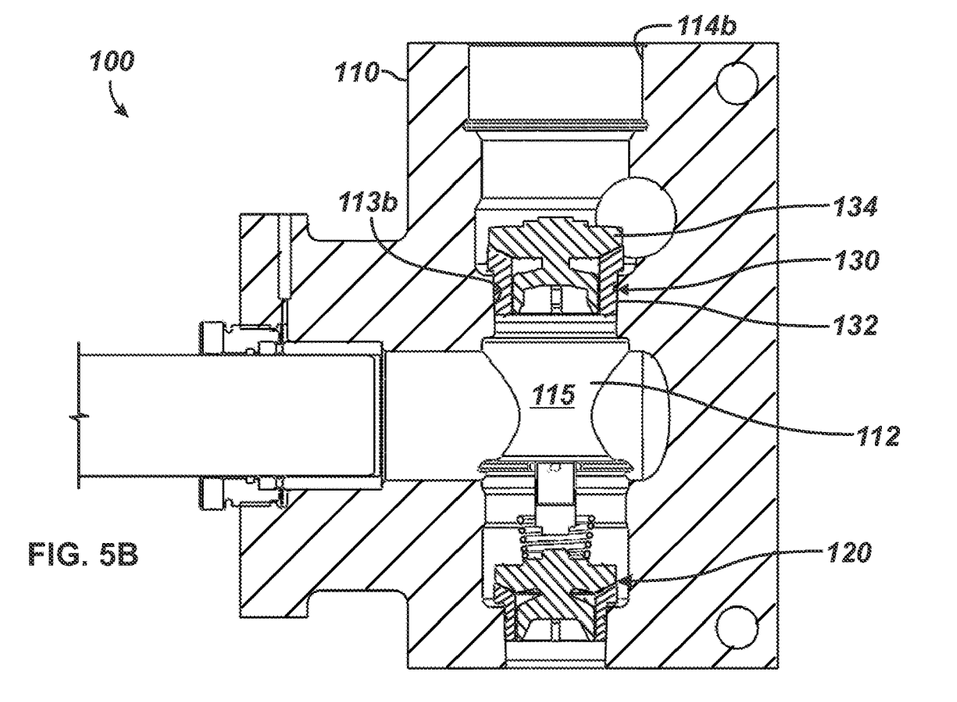

As shown in FIGS. 5A-5B, the process begins by removing the closure 140 with its sand cap 142 and retainer 144 from the second opening 114b to provide access to the outlet valve 130. The spring 138 and poppet 134 of the outlet valve 130 are removed through the second opening 114b.

Figure 5C:
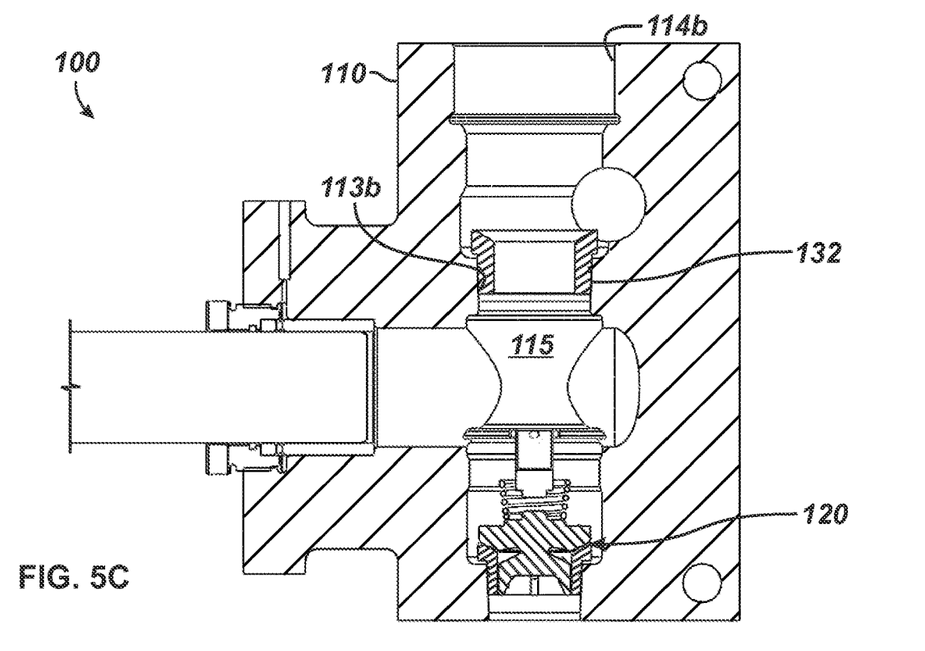
Figure 5D:
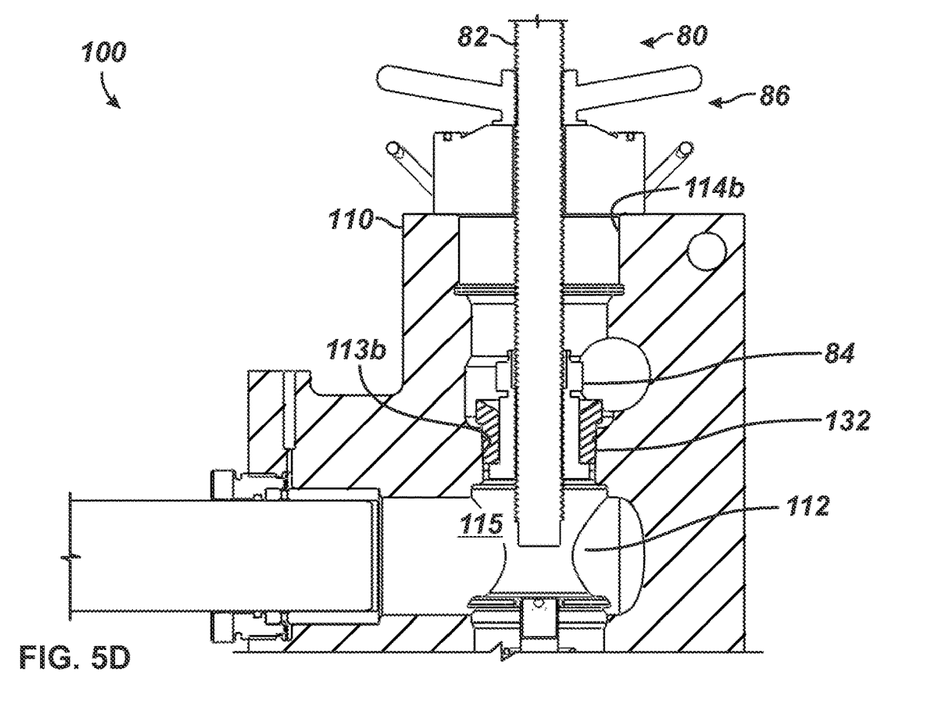

As shown in FIGS. 5C-5D, the seat removal tool 80 is inserted into second opening 114b. The puller 84 is inserted into the outlet seat 132, and the collets on the puller 84 engage with the outlet seat 132. The top nut 88 is threaded, and the hydraulic pancake 86 is energized to lift the lead screw 82, puller 84, and engaged outlet seat 132. With sufficient force, the outlet seat 132 is released from the valve pocket 113b. The removal tool 80 and the outlet seat 132 are then removed from the fluid end assembly 100 through second opening 114b.

Figure 5E:
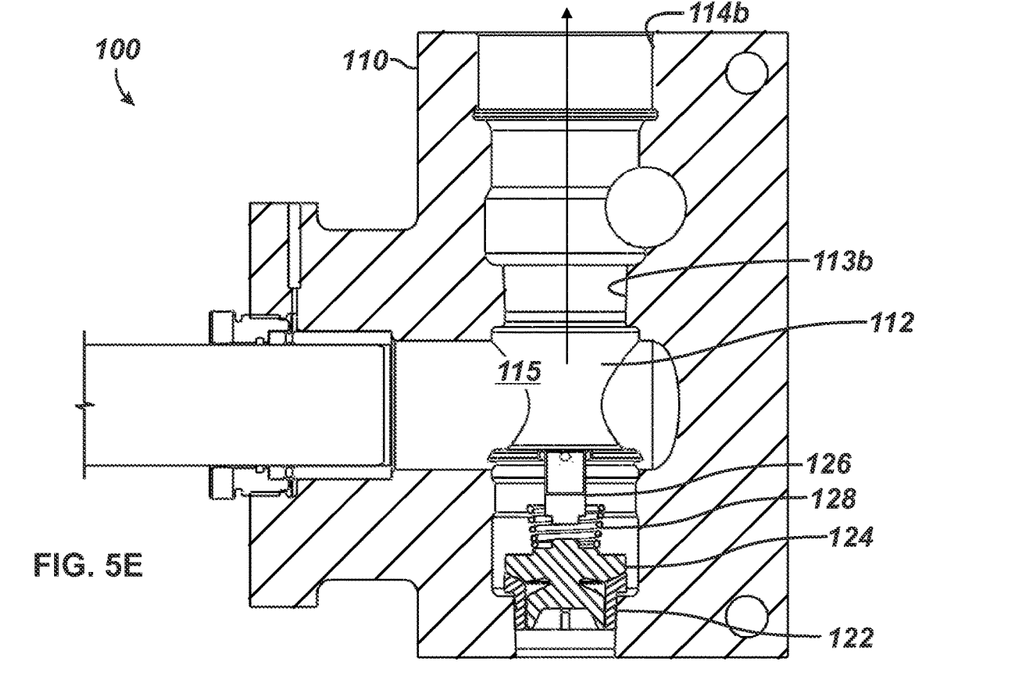
Figure 5F:
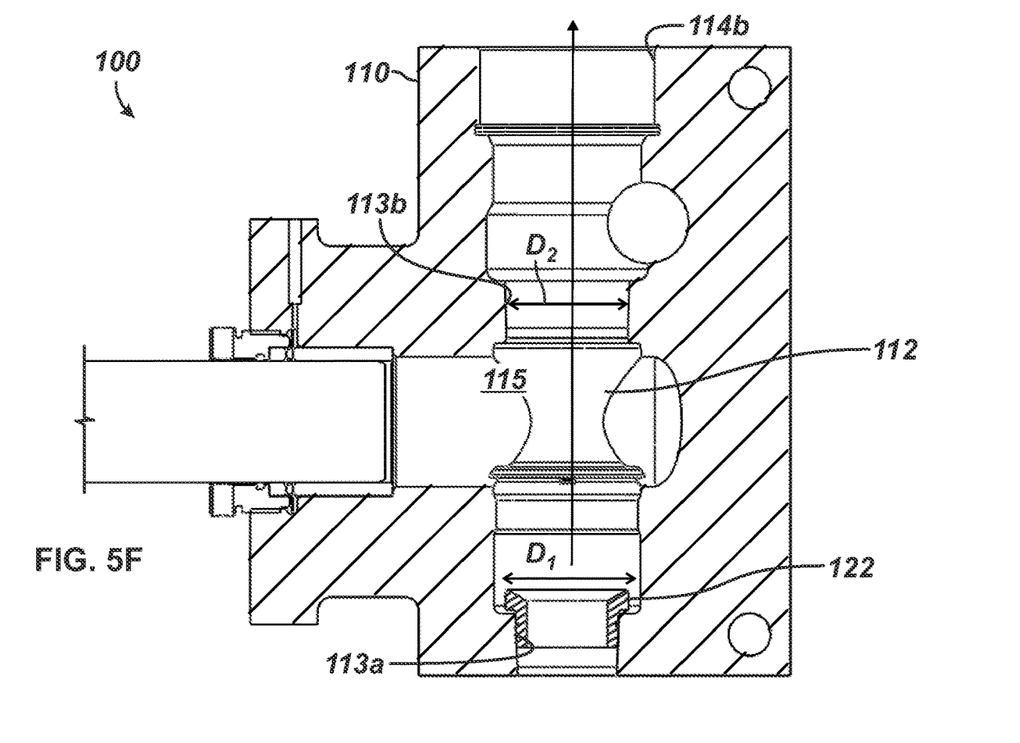

As shown in FIGS. 5E-5F, the spring retainer 126, the valve spring 128, and the poppet 124 of the inlet valve 120 are removed in the bore direction (shown by the arrow) through the second opening 114b. The maximum outer dimension of the poppet 124 can fit through the inner dimension DB of the outlet pocket 113b. Additionally, the maximum outer dimension DA of the inlet seat 122 as shown in FIG. 5F can fit through the inner dimension DB of the outlet pocket 113b.

Figure 5G:
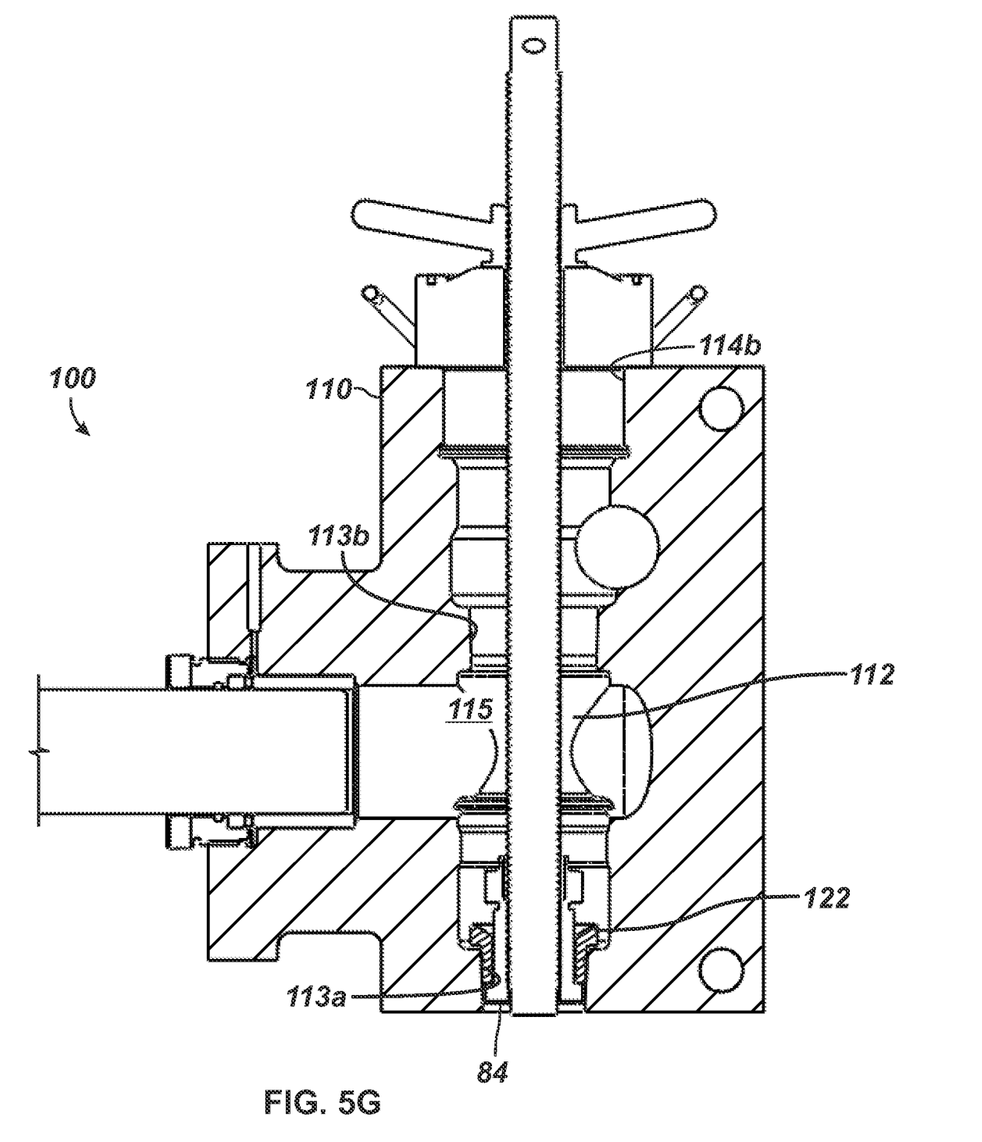

In particular, as shown in FIG. 5G, the removal tool 80 is inserted into the upper opening 114b, and the seat puller 84 is engaged with the inlet seat 122. The top nut 88 is threaded, the hydraulic pancake 86 is energized, and the inlet seat 122 is released from the inlet pocket 113a. The removal tool 80 is removed from fluid bore 112 via the upper opening 114b, and the inlet seat 122 is then removed through the upper opening 114b. As noted, the minimum inner diameter DB of the upper seat pocket 113b is larger than the maximum outer diameter DA of the inlet seat 122. For this reason, the inlet seat 122 can pass through the upper pocket 113b and can be removed from the fluid end assembly 100 via the second opening 114b.

As shown, the inlet seat 122 can be removed from the disclosed fluid end assembly 100 via upper opening 114b of the fluid bore 112. This is useful because the plunger bore 116 includes a closed inner end 119, which is integrally formed into the plunger bore 116 and can be profiled as a concave dome. Therefore, the fluid end assembly 100 lacks a conventional closure having a retainer and sand cap, which would typically need to be removed to provide access to the plunger bore 116 to remove the inlet valve 120.

As will be appreciated, installing the valves 120, 130 in the fluid end assembly 100 primarily involves a reverse of the above steps. For example, installing components within the fluid end assembly 100 can start by inserting the inlet seat 122 into the fluid bore 112 through the second opening 114b and setting the seat 122 in the inlet pocket 113a using a seat installation tool. As noted, the seat installation tool can be similarly configured as the removal tool of FIG. 2B, but the installation tool has a head that is used to push a seat into a seat pocket to make a seal that prevents washing. The inlet seat 122 has a maximum outer dimension DA configured to pass through a minimum inner dimension DB of the outlet pocket 113b. Once placed in the pocket 113a, the inlet seat 122 is seated in the inlet pocket 113a toward the first opening 114a using the installation tool. Then, the additional components (124, 126, 128) of the inlet valve 120 are installed through the second opening 114b adjacent to the inlet valve seat 122.

The method then continues by inserting the outlet seat 132 on the tool into the fluid bore 112 through the second opening 114b and seating the outlet seat 132 in the outlet pocket 113b toward the second opening 114b. The additional components (134, 138) of the outlet valve 130 are installed through the second opening 114b adjacent to the outlet valve seat 132. Finally, the closure 140 is installed at the second opening 114b of the fluid bore 112.

Figure 6:
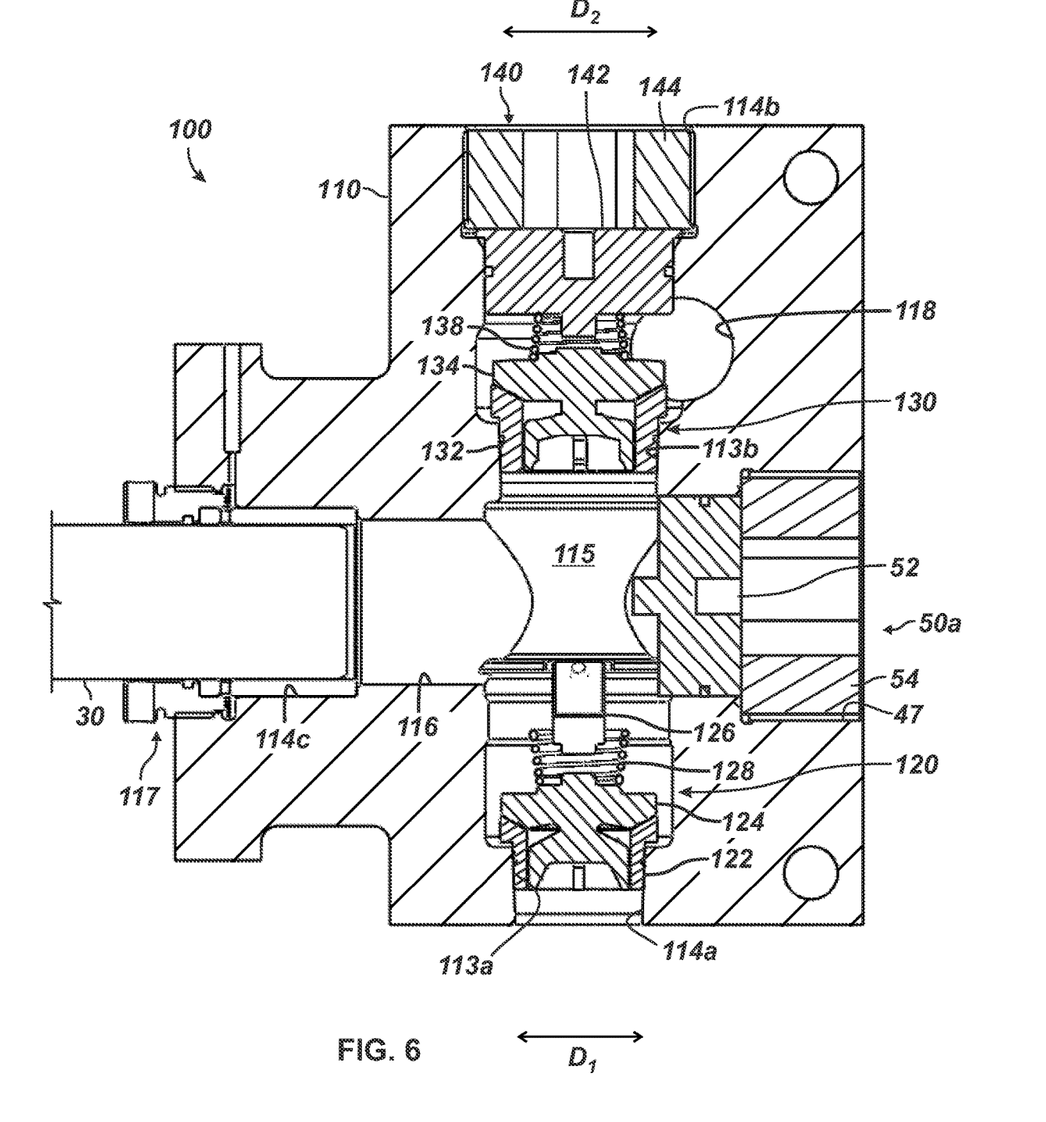
FIG. 6 is a cross-sectional view of another fluid end assembly according to the present disclosure.

As disclosed herein, the method of removing and installing valves 120, 130 in a fluid end assembly disclosed here has been described with respect to a fluid end assembly 100 having a plunger bore 116, which extends only partially in the body 110 from a third opening 114c to a closed inner end 119. However, the teachings of the present disclosure can apply to a fluid end assembly having a different construction. In particular and as shown in FIG. 6, a fluid end assembly 100 disclosed herein can have a plunger bore 116 that extends through the body 110 from a third opening 114c to an opposing face opening 114d. As in a conventional arrangement, a side closure 150 having a sand cap 152 and a retainer 154 can seal this opposing face opening 114d of the plunger bore 116. Nevertheless, such a fluid end assembly 100 can benefit from the method of removing and installing valves 120, 130 disclosed herein, especially because removing the side closure 150 does not need to be performed to service and replace the valves 120, 130.

It is to be understood that the following disclosure describes several exemplary embodiments for implementing different features, structures, or functions of the disclosed subject matter. Exemplary embodiments of components, arrangements, and configurations are described below to simplify the present disclosure; however, these exemplary embodiments are provided merely as examples and are not intended to limit the scope of the disclosed subject matter. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the disclosed subject matter, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

While the disclosure is susceptible to various modifications and alternative forms, specific embodiments thereof are shown by way of example in the drawings and description. It should be understood, however, that the drawings and detailed description thereto are not intended to limit the disclosure to the particular form disclosed, but on the contrary, the intention is to cover all modifications, equivalents and alternatives falling within the spirit and scope of the present disclosure.

The invention claimed is:

1. A method for removing components within a fluid end assembly, the fluid end assembly having a body defining a fluid bore, a plunger bore, and an outlet port, the fluid bore extending through the body between first and second openings, the fluid bore defining an inlet pocket toward the first opening, an outlet pocket toward the second opening, and a fluid chamber between the inlet and outlet pockets, the inlet pocket having a first minimum inner dimension, the outlet pocket having a second minimum inner dimension, the first minimum inner dimension being less than the second minimum inner dimension, the plunger bore extending at least partially in the body from a third opening of the body to a closed inner end and intersecting the fluid bore at the fluid chamber, the closed inner end integrally formed with the body, the outlet port communicating with the fluid bore, the method comprising:
   removing a closure from the second opening of the fluid bore;
   removing, through the second opening, an outlet valve from an outlet seat disposed in the outlet pocket toward the second opening;
   inserting a tool into the fluid bore through the second opening, attaching the tool to the outlet seat, releasing the outlet seat from the outlet pocket using the tool, and removing the outlet seat through the second opening;
   removing a stop for an inlet valve from the second opening of the fluid bore, the stop being configured to pass through the second minimum inner dimension of the outlet pocket;
   removing, through the second opening, the inlet valve from an inlet seat disposed in the inlet pocket toward the first opening, the inlet valve having a first outer dimension configured to pass through the second minimum inner dimension of the outlet pocket; and
   inserting the tool into the fluid bore through the second opening, attaching the tool to the inlet seat, releasing the inlet seat from the inlet pocket using the tool, and removing the inlet seat from the second opening, the inlet seat having a second outer dimension configured to pass through the second minimum inner dimension of the outlet pocket.

2. The method of claim 1, wherein releasing the outlet seat from the outlet pocket using the tool comprises energizing a first puller on the tool in the outlet seat until the outlet seat is released from the outlet pocket.

3. The method of claim 2, wherein releasing the inlet seat from the inlet pocket comprises energizing a second puller on the tool in the inlet seat until the inlet seat is released from the inlet pocket.

4. The method of claim 1, wherein removing the closure from the second opening of the fluid bore comprises removing a retainer and a sand cap from the second opening.

5. The method of claim 1, wherein removing the outlet valve from the outlet seat comprises removing a spring and a poppet of the outlet valve from adjacent the outlet seat.

6. The method of claim 1, wherein removing the inlet valve from the inlet seat comprises removing a spring and a poppet of the inlet valve from adjacent the inlet seat.

7. The method of claim 1, further comprising installing replacement components within the fluid end assembly by:
   inserting a replacement inlet seat into the fluid bore through the second opening and through the outlet pocket toward the second opening, the replacement inlet seat having a third outer dimension configured to pass through the second minimum inner dimension of the outlet pocket;
   seating the replacement inlet seat in the inlet pocket toward the first opening;
   installing, through the second opening, a replacement inlet valve adjacent to the inlet seat;
   installing, through the second opening, a replacement stop in the fluid bore adjacent the replacement inlet valve;
   inserting a replacement outlet seat into the fluid bore through the second opening;
   seating the replacement outlet seat in the outlet pocket toward the second opening;
   installing, through the second opening, a replacement outlet valve adjacent to the replacement outlet seat; and
   installing the closure at the second opening of the fluid bore.

8. The method of claim 7, wherein seating the replacement inlet seat in the inlet pocket comprises energizing a tool against the replacement inlet seat until the replacement inlet seat is seated in the inlet pocket.

9. The method of claim 7, wherein installing the replacement inlet valve in the inlet seat comprises installing a poppet adjacent the replacement inlet seat; installing a replacement spring adjacent the poppet; and wherein installing, through the second opening, the replacement stop in the fluid bore adjacent the replacement inlet valve comprises installing the replacement stop in the fluid bore against the replacement spring.

10. The method of claim 7, wherein installing the replacement outlet valve in the replacement outlet seat comprises installing a poppet adjacent the replacement outlet seat; and installing a spring adjacent the poppet.

11. The method of claim 7, wherein installing the closure at the second opening of the fluid bore comprises installing a sand cap in the second opening; and affixing a retainer in the second opening.

* * * * *